Jan. 31, 1933.  C. W. EBELING  1,895,455
EXCITER LAMP MOUNTING FOR SOUND-ON-FILM REPRODUCERS
Filed Feb. 10, 1931
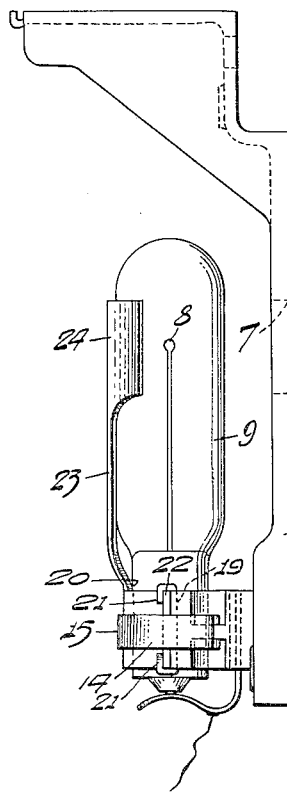
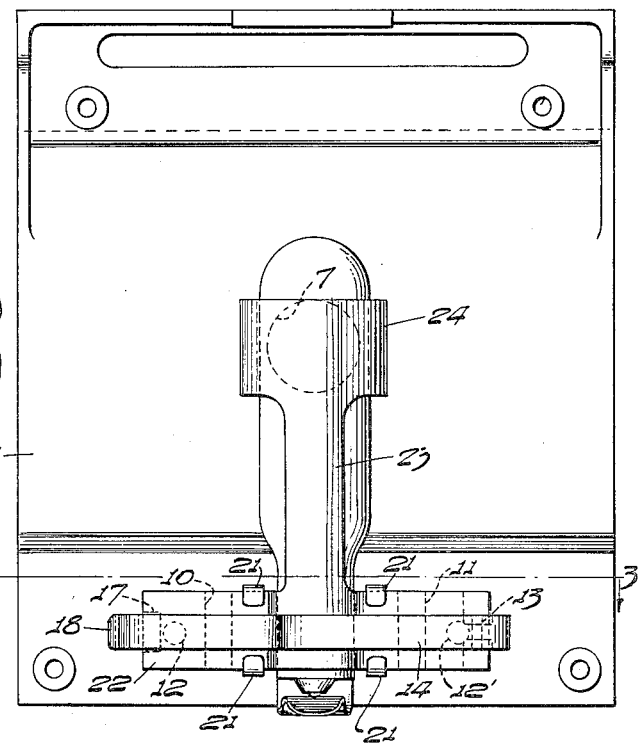
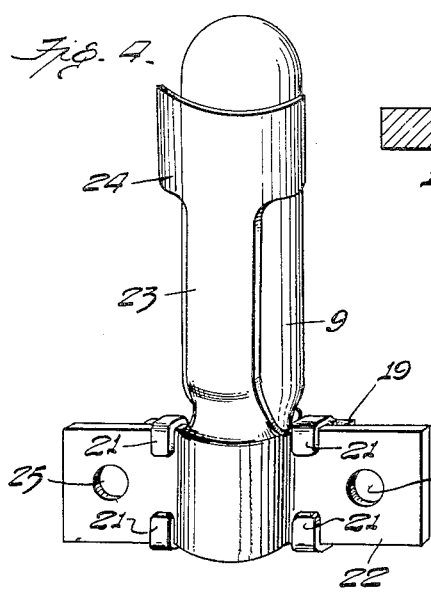
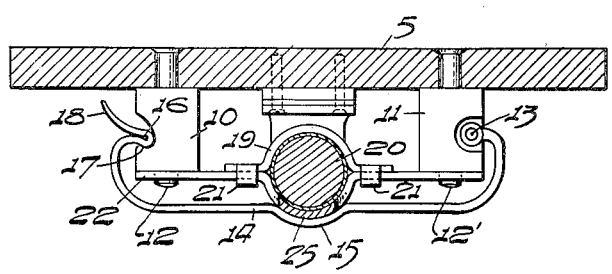
Inventor
Charles W. Ebeling
By David Pelton Moore
Attorney Patented Jan. 31, 1933 1,895,455

UNITED STATES PATENT OFFICE

CHARLES W. EBELING, OF NEW YORK, N. Y., ASSIGNOR TO GENERAL TALKING PICTURES CORPORATION, OF NEW YORK, N. Y., A CORPORATION OF DELAWARE

EXCITER LAMP MOUNTING FOR SOUND-ON-FILM REPRODUCERS

Application filed February 10, 1931. Serial No. 514,885.

The present invention relates to improvements in exciter lamp mountings for sound-on-film reproducers, one object of the invention being the provision of a means whereby the exciter lamp is bodily carried by one member to which a reflecting device is attached thereby producing when the lamp is in place in the reproducer a greater amount of illumination through the optical system and the film upon the photoelectric cell resulting in the use of less amplification in sound reproduction from the film.

Another object of this invention is the provision of cooperating means carried by the lamp holding member and the adjacent portion of the reproducing mechanism, whereby the filament of the lamp is always properly aligned with the optical system and by means of which the lamp should it burn out may be quickly removed and another one substituted.

With the foregoing and other object in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—

Figure 1 is a side elevation of the rear end of the reproducing mechanism showing the present lamp and mounting in position therein.

Figure 2 is a rear view thereof.

Figure 3 is a section taken on line 3—3 of Figure 2.

Figure 4 is a perspective view of the lamp and the socket engaging member and reflector.

Referring to the drawing, the numeral 5 designates the rear end of the sound reproducing casing provided with a tube 6 in which is adjustably mounted but not shown the optical system, there being an opening 7 through the portion 5 so that the rays of light from the filament 8 of the exciter lamp 9 may be properly aligned with and projected through the optical system.

Carried upon the support 5 are two blocks 10 and 11, each one of which is provided with a centering pin 12—12' respectively, the purpose of which will presently appear. There is hingedly attached at 13 a pivoted resilient clasp 14 having the intermediate raised portion 15 and the lug 16 which is adapted when the parts are normally in locked position to engage the notched recess 17 formed in the block 10. A finger piece 18 is carried by the locking member 14 to assist in locking and releasing the same.

A seal piece 19 is bent over and secured to the lamp plug 20 through the instrumentality of the lugs 21, which in turn securely grip the double winged member 22 to which is attached and carried a support 23 for the reflector 24 which reflector is normally disposed about the lamp adjacent the filament 8 thereof.

In order that the filament may always be in the proper position relative to the optical system, openings 25 and 25' are properly positioned in the winged member 22 after the lamp is attached and also after a thorough testing of the device in a test machine so that when the openings 25 and 25' are produced therein, and when they are placed over the centering points 12 and 12' and the locking member 14 placed into the position as shown in Figures 1 and 3, the filament 8 and its reflector 24 will be in proper position with relation to the axis of the optical system. However, the openings 25 and 25' are not formed in the wings until after the lamp is properly attached thereto and the relative position of the filament with relation to where the pins 12 and 12' should enter has been determined. This is usually done in the laboratory so that when the device as illustrated in Figure 4 is complete and ready for shipment, it constitutes a spare part that is readily substituted for the burnt out lamp in a reproducing apparatus and insures proper positioning of the filament with relation to the optical system when such spare part has been substituted.

It is possible when the filament has burnt out that the lugs 21 may be manipulated to release the old lamp and a new lamp can be substituted and the openings 25 and 25' be either rebored or filled in and bored according to the filament position of the renewal lamp.

From the foregoing description taken in connection with the drawing, it is evident that with an exciter lamp mounting of this type that the relative position of the filament is assured and the operator is not taxed to any degree in adjusting the position thereof, as is usual as the filaments of various lamps will vary within approximately ¼″, this variance before described, being taken care of at the laboratory.

It is also possible to provide the present device without the reflector 24 and will be within the scope of the present invention.

What is claimed is:

1. A lamp socket structure including a support, a member to bodily retain the lamp and having oppositely extending wings, cooperative means carried by the wings of said member and said support for centering the winged member in fixed position, and a clamping device mounted upon one portion of the said support and adapted to embrace the winged member and engage the opposite end of the support to hold the winged member securely in position.

2. A lamp socket structure including a support, a member to bodily retain the lamp and having oppositely extending wings, cooperative means carries by the wings of said member and said support for centering the winged member in fixed position, and a clamping device mounted upon one portion of the said support and adapted to embrace the winged member and engage the opposite end of the support to hold the winged member securely in position, and in which the winged member comprises a plate having a bowed portion constituting a part of the lamp embracing portion, a sealing piece having a complementary bowed portion, and means carried by the sealing piece for locking the same fixedly around the winged plate.

3. A lamp socket structure including a support, a member to bodily retain the lamp and having oppositely extending wings, cooperative means carried by the wings of said member and said support for centering the winged member in fixed position, and a clamping device mounted upon one portion of the said support and adapted to embrace the winged member and engage the opposite end of the support to hold the winged member securely in position, and in which the winged member comprises a plate having a bowed portion constituting a part of the lamp embracing portion, a sealing piece having a complementary bowed portion, and means carried by the sealing piece for locking the same fixedly around the winged plate, and in which the support includes two spaced members each of which is provided with an outstanding pin, and wherein the winged member is provided with apertures to removably fit upon said pins.

4. A lamp socket structure including a support, a member to bodily retain the lamp and having oppositely extending wings, cooperative means carried by the wings of said member and said support for centering the winged member in fixed position, and a clamping device mounted upon one portion of the said support and adapted to embrace the winged member and engage the opposite end of the support to hold the winged member securely in position, and in which the winged member comprises a plate having a bowed portion constituting a part of the lamp embracing portion, a sealing piece having a complementary bowed portion, and means carried by the sealing piece for locking the same fixedly around the winged plate, and in which the clamping device includes a resilient clasp having an intermediate contacting portion and a locking lug at the free end thereof, the portion of the support opposite to which the clamp is mounted being provided with a recess to receive said lug.

5. A lamp socket structure as claimed in claim 2, in which there is formed integral with and upstanding from the plate of the winged member a reflector carrying support.

6. A lamp structure including a substantially T-shaped member, the longer terminal of which is curved transversely at its free end and constitutes a reflector and the junction portion of the terminals of which constitutes a portion of a lamp socket receptacle.

In testimony whereof I affix my signature.

CHARLES W. EBELING.